United States Patent [19]
Jacobs

[11] 3,781,144
[45] Dec. 25, 1973

[54] CAM OPERATED COMPRESSOR
[75] Inventor: James W. Jacobs, Dayton, Ohio
[73] Assignee: General Motors Corporation, Detroit, Mich.
[22] Filed: Oct. 27, 1972
[21] Appl. No.: 301,478

[52] U.S. Cl.............. 417/525, 92/128, 92/138, 417/534
[51] Int. Cl........................ F04b 21/04, F04b 39/10
[58] Field of Search................ 417/534, 535, 536, 417/537, 525, 526; 92/128, 138

[56] References Cited
UNITED STATES PATENTS
1,818,413   8/1931   Luitwieler........................ 417/534

Primary Examiner—Carlton R. Croyle
Assistant Examiner—Richard E. Gluck
Attorney—Sidney Carter et al.

[57] ABSTRACT

A refrigerant compressor with a dual ended and double acting piston which supports two roller bearings adjacent its ends. A cam portion on a drive shaft has diametrically opposite large radius lobe portions and smaller radius portions which are positioned between the two roller bearings. The roller bearings are supported on eccentric pins which adjustably vary the distance therebetween for easier assembly of the drive shaft and simple adjustment of the clearance between the bearings and the surface of the cam portion.

3 Claims, 3 Drawing Figures

PATENTED DEC 25 1973 3,781,144
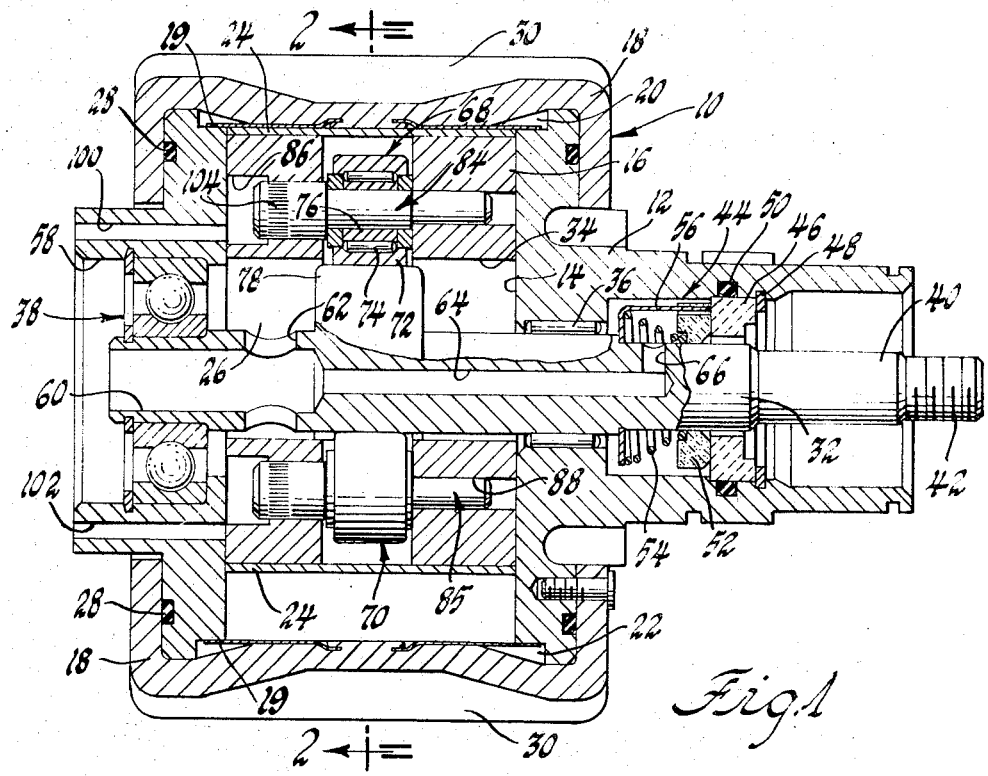
Fig.1
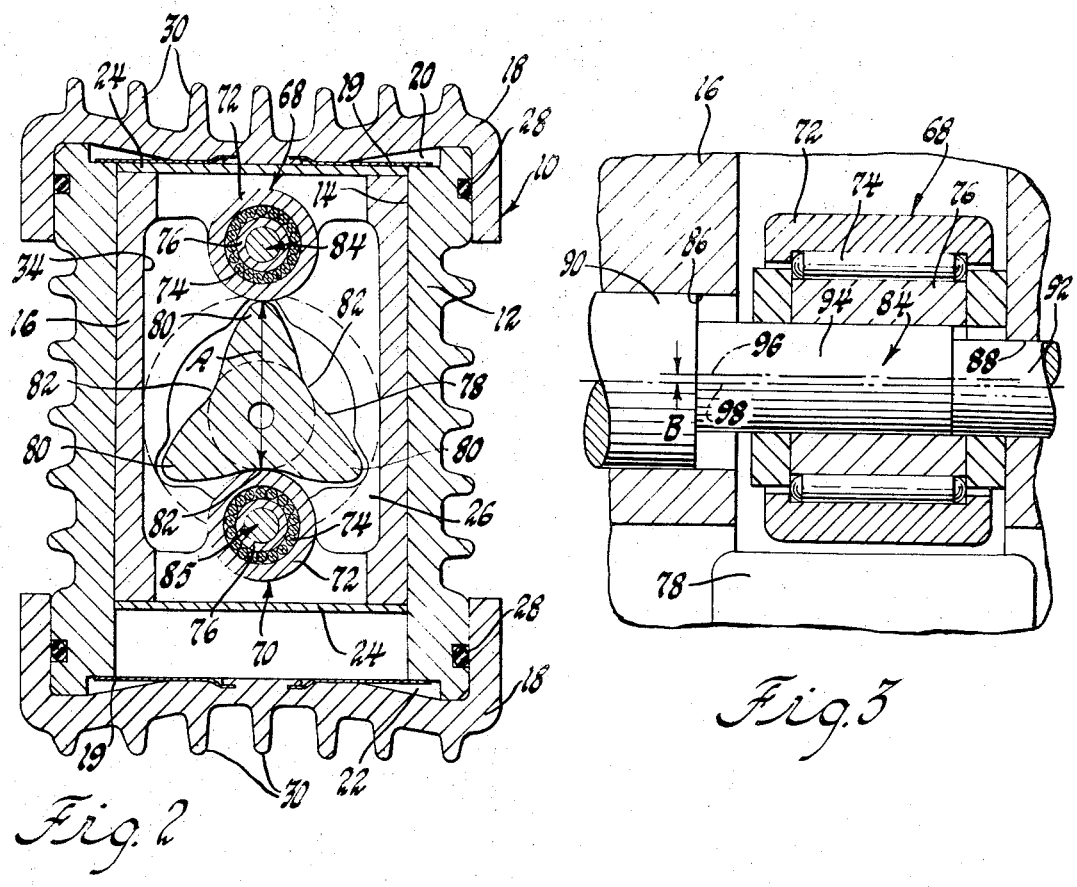
Fig.2
Fig.3

CAM OPERATED COMPRESSOR

This invention relates to reciprocal piston compresors for air conditioning.

The present invention discloses a compact and economical compressor especially adapted for use in automotive air conditioning systems. The compressor housing has a cylindrical bore in which a dual ended piston is reciprocal. Two compression chambers are formed at either end of the piston. A cam portion on a drive shaft extends through the piston's midportion and operably engages the piston to cause reciprocation within the cylinder bore. More particularly, a roller bearing is supported on an eccentric pin adjacent either end of the piston. The bearings engage the cam portion of the drive shaft and cause the piston to reciprocate.

The cam has an odd number of radially outwardly extending large radius portions wyich are symmetrically spaced around the drive shaft. This produces diametrically opposite large radius and smaller radius portions. The roller bearings which are supported adjacent the ends of the double ended piston engage diametrically opposite sides of the cam to cause reciprocation of the piston within the cylinder bore. The cam portion is configured so that the distance between the contact areas with the bearings remains constant as the shaft rotates.

Each roller bearing is supported adjacent an end of the piston upon eccentric pins which change the distance between the bearings when the pins are rotated. The compressor is easily and conveniently assembled by turning the eccentric pins to a position providing maximum spacing between the roller bearings. After the cam is located between the roller bearings, the eccentric pins are then rotated to move the roller bearings toward one another and into proper engagement with the cam.

Therefore, an object of the present invention is to provide a compact refrigerant compressor for air conditioning systems which includes means for easily and conveniently assembling a cammed portion of a drive shaft through a cutout portion in a piston between bearings supported at either end of the piston.

A further object of the present invention is to provide a refrigerant compressor of the dual ended and double acting piston type having bearings at either end which engage a cam portion on a drive shaft for reciprocating the piston within the cylinder and with eccentric support means for the bearings so the space therebetween may be initially adjusted to a maximum distance for convenient insertion of the cam within the housing and through a cut out portion of the piston and so subsequently the bearings can be moved toward one another and into in engagement with said cam.

Further objects and advantages of the present invention will be readily apparent from the following detailed description, reference being had to the accompanying drawings in which a preferred embodiment is clearly shown.

In the drawings:

FIG. 1 is a sectioned vertical view of the refrigerant compressor showing the eccentric mounting of the bearings;

FIG. 2 is a vertical sectioned view taken along section line 2—2 in FIG. 1 and looking in the direction of the arrows; and FIG. 3 is an enlarged fragmentary view of an eccentric pin mount for one of the bearings.

In FIG. 1 of the drawings, a refrigerant compressor 10 is illustrated. The compressor 10 includes a housing 12 with a cylinder bore 14 therein. A dual ended piston 16 is mounted in the cylinder bore 14 for reciprocation. The piston 16 is of tubular construction. Two cylinder heads 18 cover the ends of the cylinder bore 14 and with discharge valves 19 define compression chambers 20 and 22 at either end of the piston 16. A leaf type inlet valve 24 is welded at diametrically opposite portions of its peripheral edge to the tubular end of the piston 16. When the piston 16 moves away from the heads 18, the valve 24 lifts away from the end of the piston to control flow of refrigerant from a suction cavity 26 in the interior of the housing 12 to the compression chambers 20 and 22. O-rings 28 between the cylinder heads 18 and the housing 12 seals the refrigerant within the compression chambers 20 and 22 during compression strokes. Fins 30 on the cylinder heads 18 dispense heat caused by compression of the refrigerant.

A drive shaft 32 is supported within housing 12 for rotation. The drive shaft 32 extends through a cutout midportion 34 in the piston 16. The drive shaft 32 is supported at one end by needle bearings 36 located between the shaft 32 and housing 12. A ball bearing assembly 38 supports the other end of the drive shaft 32 in the housing 12. A reduced diameter portion 40 on one end of the drive shaft is adapted to support a pulley (not shown) which is adapted to be connected by a belt to the crankshaft of an automobile engine for rotating drive shaft 32. The threaded end 42 of the shaft is adapted to engage a nut for holding the pulley to the shaft 32. Leakage of refrigerant from the housing is prevented by a seal assembly 44 which includes a stationary ring member 46, an expansion retainer 48, an O-ring 50, a rotating member 52, a coil spring 54 and spring retaining member 56. The sliding contact between rotating member 52 and non-rotating member 46 seals the refrigerant in housing 12.

Refrigerant enters compressor 10 through a suction inlet 58 in one end of housing 12 adjacent bearing assembly 38. Refrigerant flows through the bearing 38 and passages 60, 62 in the drive shaft 32 into the suction cavity 26. A small diameter axial passage 64 and radial passage 66 conducts refrigerant to the seal assembly 44. This lubricates and cools the seal thus reducing wear.

As best shown in FIGS. 1 and 3, the piston 16 has roller bearings 68 and 70 supported adjacent the ends of the piston 16. The roller bearings 68, 70 include an outer sleeve 72, a number of small needle bearings 74 and an inner sleeve 76. The roller bearings 68 and 70 are adapted to engage a cam portion 78 on the drive shaft 32. The cam 78 includes outwardly extending lobes 80 which are symmetrically arranged around the cam portion and have smaller radius portions 82 inbetween. In the embodiment illustrated, a cam with three lobes 80 is illustrated. The reason for providing an odd number of lobes is so that an outwardly directed lobe 80 is always diametrically opposite a smaller radius portion 82. The profile of the cam 78 is characterized by continuous engagement between the surfaces of the cam and the two roller bearings 68 and 70 as the cam is rotated with the drive shaft 32. The desirable clearance between the two roller bearings 68 and 70 may be a slight gap or tolerance for accommodation of expansion and contraction of the piston assembly. This may prevent binding and unnecessary friction between the cam portion 78 and roller bearings 68 and 70.

When compressor 10 is assembled, the drive shaft 32 and cam portion 78 are inserted through inlet 58 into the cutout 34 in piston 16. If the roller bearings 68 and 70 are initially spaced the desirable running distance A apart as in FIGS. 1 and 2, the insertion of the cam 78 into the piston can be difficult and time consuming. Therefore, as best shown in FIG. 3, the roller bearings 68 and 70 are supported by pins 84, 85 which extend into aligned bores 86 and 88 in the piston 16. The pins 84 have a large diameter head portion 90, a coaxial smaller diameter portion 92 at the other end and an eccentric central portion 94. The eccentric portion 94 has an axis 96 shown in FIG. 3 which is offset a predetermined distance B from the axis 98 of head portion 90 and end portion 92. In FIG. 3 the pin 84 is illustrated in its initial position for insertion of cam 78 into the piston. When both pins 84, 85 are oriented as shown the distance between bearings 68, 70 is about $A + 2B$. This arrangement permits relative movement of the roller bearings 68 and 70 away from one another by rotation of the pins 84 in bores 86 and 88. The pins 84 may be rotated with piston 16 in cylinder 14 by insertion of a hexagonal shaped tool (not shown) through the ports 100 and 102 in the housing 12. The roller bearings are initially separated a maximum distance apart and subsequently moved to the dimension A after insertion of the cam 78 between the roller bearings 68 and 70. The knurling marks 104 around the periphery of the head portion 90 maintains the angular relation between the pins 84 and the piston 16 once it is set. Ports 100, 102 then may be sealed to prevent refrigerant leakage.

While the embodiment illustrated is a preferred embodiment, other embodiments might be adapted.

What is claimed is as follows:

1. A refrigerant compressor comprising: a housing having a cylindrical bore therein; a rotatable drive shaft extending through said housing normal to and intersecting an axis of said cylinder; a dual ended piston in said cylinder having a cutout midportion through which said drive shaft extends; a cam portion on said drive shaft with an odd number of circumferentially spaced and outwardly extending lobes with smaller diameter portions therebetween; said cam having diametrically opposite lobes and small diameter portions; bearing means supported at either end of said piston adapted to engage opposite sides of said cam portion of said drive shaft for causing reciprocation of said piston in said cylinder as said drive shaft and cam are rotated; eccentric means supporting said bearings for adjustably positioning said bearings a desirable distance apart to engage opposite sides of said cam whereby said bearings are initially set a maximum distance apart by said eccentric means to enable said cam portion of said drive shaft to be easily inserted between said bearings and subsequently said bearings are moved toward one another by said eccentric means into engagement with opposite sides of said cam to produce desirable engagement of the bearings and the cam surfaces for operating said compressor.

2. A refrigerant compressor comprising: a housing having a cylindrical bore therein; a rotatable drive shaft extending through said housing and normal to and intersecting an axis of said cylinder; a dual ended piston in said cylinder having an open midportion through which said drive shaft extends; a cam portion on said drive shaft with an odd number of circumferentially spaced and outwardly extending lobes with smaller diameter portions therebetween; said cam having diametrically opposite lobes and small diameter portions; a roller bearing supported at either end of said piston and at opposite sides of said drive shaft adapted to engage opposite surfaces of said cam for producing reciprocation of said piston in said cylinder as said drive shaft and cam are rotated; eccentric pins in either end of said piston for supporting said roller bearings and for adjustably positioning the bearings a desirable distance apart; ports in said housing for providing access to said eccentric pins for permitting them to be rotated while said piston is within said cylinder whereby said bearings are initially set a maximum distance apart by rotating said eccentric pins to enable said cam portion of said drive shaft to be easily inserted between said roller bearings and subsequently said roller bearings may be moved toward one another by rotating said eccentric pins to cause engagement of said roller bearings with the opposite sides of said cam to produce desirable engagement of the bearings and the cam surfaces for operating said compressor.

3. A refrigerant compressor comprising: a housing having a cylindrical bore therein; a rotatable drive shaft extending through said housing normal to and intersecting an axis of said cylinder; a tubular piston in said cylinder having a cutout midportion through which said drive shaft extends; inlet valve means covering the ends of said tubular piston for directing refrigerant from the interior of the compressor into compression chambers adjacent the piston end; cam means on said drive shaft with three circumferentially spaced and outwardly extending lobes with smaller diameter portions therebetween; cam having diametrically opposite lobes and small diameter portions; a roller bearing supported at either end of said piston and at opposite sides of said drive shaft adapted to engage opposite surfaces of said cam for producing reciprocation of said piston in said cylinder as said drive shaft and cam portion are rotated; eccentric pins in either end of said piston for supporting said roller bearings and for adjustably positioning said roller bearings a desirable distance apart; ports in said housing for providing access to said eccentric pins for permitting selective rotation from outside said housing when said piston is within said cylinder; whereby said bearings are initially set a maximum distance apart by rotating said eccentric pins to enable said cam portion of said drive shaft to be easily inserted between said roller bearings and subsequently said roller bearings may be moved toward one another by rotating said eccentric pins to cause engagement of said roller bearings with the opposite sides of said cam.

* * * * *